United States Patent
Kang et al.

(10) Patent No.: US 8,703,347 B2
(45) Date of Patent: Apr. 22, 2014

(54) FLAT FUEL CELL ASSEMBLY HAVING GAS BARRIER MATERIAL LAYER

(75) Inventors: Ku-Yen Kang, Hsinchu (TW); Chun-Ho Tai, Hsinchu (TW); Chiou-Chu Lai, Hsinchu County (TW); Ying-Ying Hsu, Kaohsiung (TW); Yin-Wen Tsai, Nantou County (TW)

(73) Assignee: Industrial Technology Research Institute, Hsinchu (TW)

(*) Notice: Subject to any disclaimer, the term of this patent is extended or adjusted under 35 U.S.C. 154(b) by 860 days.

(21) Appl. No.: 11/842,176

(22) Filed: Aug. 21, 2007

(65) Prior Publication Data

US 2008/0096091 A1 Apr. 24, 2008

(30) Foreign Application Priority Data

Oct. 20, 2006 (TW) .................................. 95138689

(51) Int. Cl.
| | |
|---|---|
| H01M 8/06 | (2006.01) |
| H01M 8/02 | (2006.01) |
| H01M 8/04 | (2006.01) |
| H01M 4/86 | (2006.01) |
| H01M 8/10 | (2006.01) |

(52) U.S. Cl.
CPC ...... *H01M 8/04164* (2013.01); *H01M 8/04156* (2013.01); *H01M 8/04291* (2013.01); *H01M 4/8605* (2013.01); *H01M 8/1018* (2013.01)
USPC ............ 429/414; 429/529; 429/483; 429/517

(58) Field of Classification Search
CPC ....... H01M 4/86; H01M 4/8605; H01M 8/02; H01M 8/04156; H01M 8/04291; H01M 2008/1095
USPC .......... 429/408, 412, 414, 450, 479, 483, 517, 429/529
See application file for complete search history.

(56) References Cited

U.S. PATENT DOCUMENTS

| | | | | |
|---|---|---|---|---|
| 3,418,169 | A | | 12/1968 | Matsen |
| 2003/0180594 | A1 | * | 9/2003 | Choi et al. .................... 429/32 |

(Continued)

FOREIGN PATENT DOCUMENTS

| | | | | | |
|---|---|---|---|---|---|
| JP | 2005038738 | A | * | 2/2005 | ............. H01M 8/02 |
| JP | 2006-269126 | | | 10/2006 | |

(Continued)

OTHER PUBLICATIONS

"E-TEK ELAT Gas Diffusion Layers". Accessd on: Jul. 30, 2012. Web: http://fuelcellstore.com/products/etek/LT1200-W.pdf.*

(Continued)

*Primary Examiner* — Edu E Enin-Okut
(74) *Attorney, Agent, or Firm* — Jianq Chyun IP Office

(57) ABSTRACT

A flat fuel cell assembly including a membrane electrode assembly, a cathode porous current collector, an anode porous current collector and a gas barrier material layer is provided. The membrane electrode assembly includes a proton conducting membrane, an anode catalyst layer and a cathode catalyst layer disposed respectively on two sides of the proton conducting membrane, and an anode gas diffusion layer and a cathode gas diffusion layer disposed respectively on the anode catalyst layer and the cathode catalyst layer. The cathode porous current collector is disposed on one side of the cathode gas diffusion layer. The anode porous current collector is disposed on one side of the anode gas diffusion layer. The gas barrier material layer having at least an opening exposing the surface of the cathode gas diffusion layer is disposed on the cathode gas diffusion layer.

11 Claims, 5 Drawing Sheets

(56) References Cited

U.S. PATENT DOCUMENTS

| | | |
|---|---|---|
| 2004/0209133 A1 | 10/2004 | Hirsch et al. |
| 2004/0209153 A1 | 10/2004 | Peled et al. |
| 2004/0209154 A1 | 10/2004 | Ren et al. |
| 2005/0079398 A1 | 4/2005 | Tomioka et al. |
| 2005/0164071 A1* | 7/2005 | Horiguchi ................ 429/38 |
| 2005/0202291 A1* | 9/2005 | Schweizer ............... 429/13 |
| 2006/0019135 A1* | 1/2006 | Curello et al. .............. 429/22 |
| 2006/0035124 A1 | 2/2006 | Takei |
| 2006/0199061 A1* | 9/2006 | Fiebig et al. ............... 429/32 |
| 2007/0059575 A1 | 3/2007 | Kan et al. |

FOREIGN PATENT DOCUMENTS

| | | | |
|---|---|---|---|
| JP | 2006269126 A * | 10/2006 | ............ H01M 8/02 |
| WO | 2005112172 | 11/2005 | |
| WO | 2006101071 | 9/2006 | |

OTHER PUBLICATIONS

"Office Action of Taiwan Counterpart Application", issued on Dec. 15, 2010, p. 1-p. 6.

"Office Action of U.S. counterpart application" issued on Aug. 3, 2012, p. 1-p. 17.

* cited by examiner

FLAT FUEL CELL ASSEMBLY HAVING GAS BARRIER MATERIAL LAYER

CROSS-REFERENCE TO RELATED APPLICATION

This application claims the priority benefit of Taiwan application serial no. 95138689, filed Oct. 20, 2006. All disclosure of the Taiwan application is incorporated herein by reference.

BACKGROUND OF THE INVENTION

1. Field of the Invention

The present invention relates to a fuel cell structure, and more particularly to a flat fuel cell assembly.

2. Description of Related Art

With the rapid development of industry, the consumption of conventional energy source such as coal, petroleum, and natural gas is increasingly high, and due to the limited storage of natural energy source, novel alternative energy source must be researched and developed to substitute the conventional energy source, and the fuel cell is taken as an important and practical choice.

In brief, the fuel cell is substantially a power generator that converts chemical energy into electric energy by utilizing the reverse reaction of the water electrolysis. The proton exchanging membrane fuel cell mainly includes a membrane electrode assembly (MEA) and two electrode plates. The MEA includes a proton conducting membrane, an anode catalyst layer, a cathode catalyst layer, an anode gas diffusion layer (GDL) and a cathode GDL. The anode catalyst layer and the cathode catalyst layer are respectively disposed on two sides of the proton conducting membrane, and the anode GDL and the cathode GDL are respectively disposed on the anode catalyst layer and the cathode catalyst layer. Furthermore, two electrode plates include an anode and a cathode, which are respectively disposed on the anode GDL and the cathode GDL.

Currently, the common proton exchanging membrane fuel cell is Direct Methanol Fuel Cell (DMFC), which directly takes the methanol aqueous solution as the source for supplying fuel, and generates currents through the relevant electrode reaction between methanol and oxygen, wherein the reaction formulas of the DMFC are shown as follows:

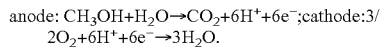
anode: $CH_3OH+H_2O \rightarrow CO_2+6H^++6e^-$; cathode: $3/2O_2+6H^++6e^- \rightarrow 3H_2O$.

During the reaction, 1 mol of water is consumed at anode, three mol of water is generated at the cathode, and the water generated in the reaction must be removed immediately, and cannot be kept at the surface of the catalyst layer, in such a manner, the fuel cell can react continuously, thereby generating currents.

As for the water management in the fuel cell, many solutions have been proposed in this field. For example, early US Patent Publication No. 2005/0079398A1 (U.S. Pub. No. 2005/0079398A1) entitled "FUEL CELL" had disclosed that, additional devices such as pump, heat sink, and fan are used to remove the water generated in the fuel cell. However, this method increases the cost, and enlarges the volume of the whole assembly, which thus cannot be miniaturized. Furthermore, early US Patent Publication No. 2004/0209154A1 (U.S. Pub. No. 2004/0209154A1) entitled "PASSIVE WATER MANAGEMENT TECHNIQUES IN DIRECT METHANOL FUEL CELLS" had disclosed that, a hydrophobic material layer with micro-pores is disposed at the external side of the cathode, such that the water of cathode generates a back pressure there-between; then, the water is permeated to anode by utilizing the pressure difference between two sides of the proton conducting membrane, such that the water is recycled and used within the fuel cell. However, this method causes the problem that the micro pores are blocked by water or the water cannot be recycled. Thus, the above method is complicated in manufacturing, and the method even causes the problem that the air cannot be entered therein smoothly, thereby influencing the output power of the fuel cell.

Another water management in the fuel cell is provided in the Japan Patent Gazette WO 2006/101071, which had disclosed a fuel cell having an air chamber on the cathode side, and a humidity-holding sheet is filled in the air chamber. The humidity-holding sheet is mainly used to prevent the water generated at the cathode side from evaporating, and further increase the water storage in the cathode catalyst layer. Through the osmotic pressure phenomenon, the water generated in the cathode catalyst layer is promoted to move towards the anode catalyst layer.

Furthermore, the Japan Patent Gazette WO 2005/112172A1 had disclosed a fuel cell that vaporize the liquid fuel and then supply it to the catalyst layer, wherein the anode structure of the fuel cell must include a fuel tank, a fuel vaporizing layer and a vaporized fuel collector and the like, so as to vaporize the liquid fuel, and the cathode includes a humidity-holding layer with an appropriate moisture permeability and air permeability. However, the humidity-holding layer is made of a porous material with uniform micro pores, and during practical use, the micro pores are easily to be blocked due to the condensation of moisture, such that the gas cannot enter therein, thereby influencing the output power of the fuel cell.

In view of the above, the water management is a crucial technique for the fuel cell, which has become a key issue being researched and developed in this field.

SUMMARY OF THE INVENTION

In view of the above, the present invention is directed to providing a flat fuel cell assembly, which is capable of diffusing the water at the cathode part into the anode part for being reused, and has a simple manufacturing method, thereby enhancing the energy conservation efficiency of the fuel.

As embodied and broadly described herein, the present invention provides a flat fuel cell assembly, which comprises a MEA, a cathode porous current collector, an anode porous current collector and a gas barrier material layer. The MEA comprises a proton conducting membrane, an anode catalyst layer, a cathode catalyst layer, an anode GDL and a cathode GDL. The anode catalyst layer and the cathode catalyst layer are respectively disposed on two sides of the proton conducting membrane. The anode GDL and the cathode GDL are respectively disposed on the anode catalyst layer and the cathode catalyst layer. The cathode porous current collector is disposed on one side of the cathode GDL of the MEA. The anode porous current collector is disposed on one side of the anode GDL of the MEA. Furthermore, the gas barrier material layer having at least one opening for exposing the surface of the cathode porous current collector is disposed on the cathode porous current collector.

In the flat fuel cell assembly according to an embodiment of the present invention, the opening ratio of the gas barrier material layer falls within 0.5%-60%.

In the flat fuel cell assembly according to an embodiment of the present invention, the material of the gas barrier material layer comprises a polyester polymer or a polyolefin polymer, wherein the polyester polymer is, for example, polyethylene terephthalate (PET) or polyacrylonitrile (PAN), and the polyolefin polymer is, for example, polyethylene (PE), polypropylene (PP), or another gas barrier material suitable for opening processing.

In the flat fuel cell assembly according to an embodiment of the present invention, the thickness of the gas barrier material layer falls within 10 μm-5 mm.

In the flat fuel cell assembly according to an embodiment of the present invention, a gap is provided between the gas barrier material layer and the cathode porous current collector, and the width of the gap falls within 0-1.5 cm.

In the flat fuel cell assembly according to an embodiment of the present invention, the gas barrier material layer is in contact with the cathode porous current collector.

In the flat fuel cell assembly according to an embodiment of the present invention, the flat fuel cell assembly further includes a hydrophobic porous material layer disposed between the cathode porous current collector and the gas barrier material layer. The material of the hydrophobic porous material layer is, for example, polytetrafluoroethylene (PTFE), polypropylene (PP), or polyethersulfone (PES), or relevant material with hydrophobic measures coated on its surface and the opening. In one embodiment, the hydrophobic porous material completely covers the cathode porous current collector. In another embodiment, the hydrophobic porous material is located on the cathode porous current collector exposed by the opening of the gas barrier material layer.

In the flat fuel cell assembly according to an embodiment of the present invention, the material of the proton conducting membrane is, for example, polymeric membrane.

In the flat fuel cell assembly according to an embodiment of the present invention, the material of the anode catalyst layer is, for example, Pt/Ru alloy, carbon material particles plated with Pt/Ru alloy or carbon material particles plated with Pt.

In the flat fuel cell assembly according to an embodiment of the present invention, the material of the cathode catalyst layer is, for example, Pt alloy, carbon material particles plated with Pt alloy or carbon material particles plated with Pt.

The flat fuel cell assembly of the present invention disposes the gas barrier material layer having at least one opening on the cathode porous current collector, such that the water in the cathode catalyst layer diffuses to the anode catalyst layer, and the water of the cathode catalyst layer is recycled, therefore, the manufacturing method is relatively simple and fewer elements are required, thereby saving the manufacturing cost. Furthermore, the present invention does not need to change the internal structure of the MEA in the current fuel cell. On the other aspect, the flat fuel cell assembly of the present invention utilizes the high concentration fuel to perform the reaction, thereby enhancing the energy conversion efficiency of the fuel. In addition, the flat fuel cell assembly of the present invention further includes a hydrophobic porous material layer disposed between the cathode porous current collector and the gas barrier material layer, which is used to maintain an extremely high and uniform humidity on the gas barrier material layer, so as to achieve a more preferred effect of recycling the water.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
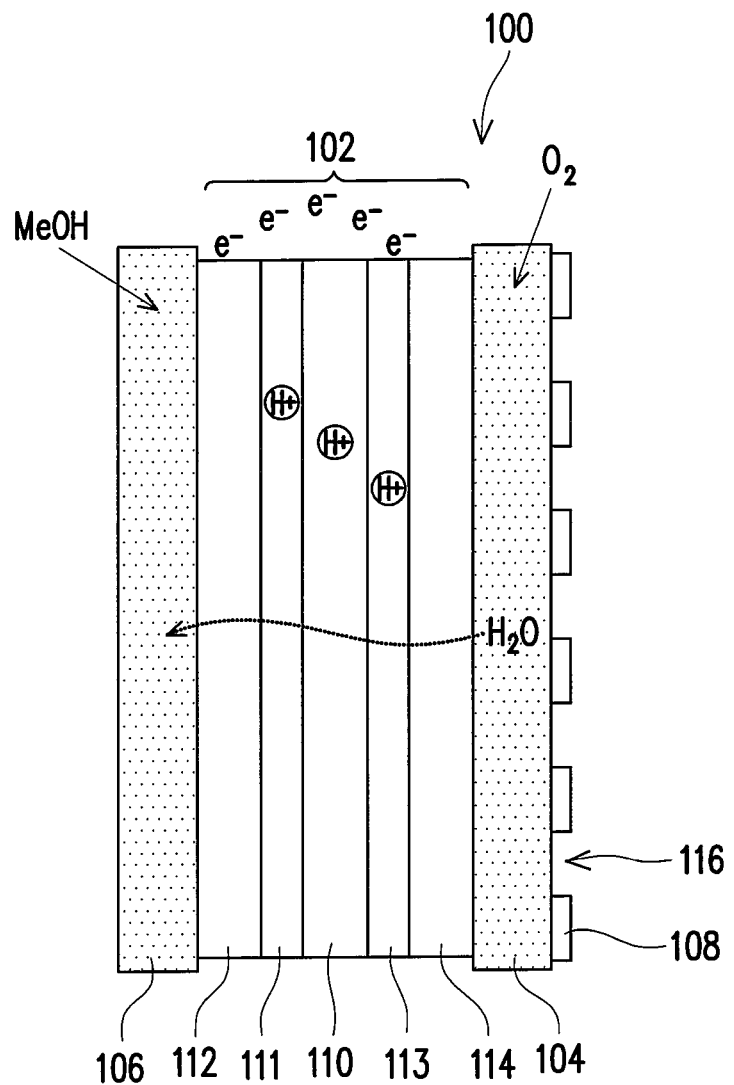
FIG. 1 is a schematic structural view of a flat fuel cell assembly according to an embodiment of the present invention.

FIG. 1 is a schematic structural view of a flat fuel cell assembly according to an embodiment of the present invention. Referring to FIG. 1, the flat fuel cell assembly 100 includes a membrane electrode assembly (MEA) 102, a cathode porous current collector 104, an anode porous current collector 106 and a gas barrier material layer 108. The MEA 102 includes a proton conducting membrane 110, an anode catalyst layer 111, a cathode catalyst layer 113, an anode gas diffusion layer (GDL) 112 and a cathode GDL 114, wherein the anode catalyst layer 111 and the cathode catalyst layer 113 are respectively disposed on both sides of the proton conducting membrane 110, and the anode GDL 112 and the cathode GDL 114 are respectively disposed on the anode catalyst layer 111 and the cathode catalyst layer 113. The material of the anode catalyst layer 111 is, for example, Pt/Ru alloy, carbon material particles plated with Pt/Ru alloy, carbon material particles plated with Pt or other suitable materials. The material of the cathode catalyst layer 113 is, for example, Pt alloy, carbon material particles plated with Pt alloy, carbon material particles plated with Pt or other suitable materials. The proton conducting membrane 110 is served as the electrolyte membrane for transmitting protons, and the material thereof is, for example, polymeric membrane, which is, for example, Nafion membrane (brand name) fabricated by the DuPont Company, USA.

The anode porous current collector 106 is disposed on one side of the anode GDL 112 of the MEA 102. The material of the anode porous current collector 106 is, for example, conducting materials, such as Ti and the alloy thereof. The cathode porous current collector 104 is disposed on one side of the cathode GDL 114 of the MEA 102. In an embodiment of the present invention, the material of the cathode porous current collector 104 is, for example, conducting materials, such as Ti and the alloy thereof.

The flat fuel cell assembly 100 in this embodiment further includes a gas barrier material layer 108, which is disposed on the cathode porous current collector 104, and in contact with the cathode porous current collector 104. The material of the gas barrier material layer 108 includes, for example, polyester polymer or a polyolefin polymer, wherein the polyester polymer is, for example, polyethylene terephthalate (PET) or polyacrylonitrile (PAN), and the polyolefin polymer is, for example, polyethylene (PE), polypropylene (PP), or another gas barrier material suitable for opening processing. The thickness of the gas barrier material layer falls within, for example, 10 μm-5 mm. In an embodiment of the present invention, the thickness of the gas barrier material layer 108 is, for example, about 100 μm. The gas barrier material layer 108 is used to control the evaporation speed of the water generated by the cathode catalyst layer 113 after the reaction, such that the water of the cathode catalyst layer 113 is diffused to the anode catalyst layer 111 via the proton conducting membrane 110, therefore, the water of the cathode catalyst layer 113 can be supplied to the anode catalyst layer 111 for being used in the reaction.

The gas barrier material layer 108 has at least one opening for exposing the surface of the cathode porous current collector 104, and in this embodiment, a plurality of openings 116 are depicted for being taken as an example. Moreover, in the embodiments of the present invention, the shape of the openings 116 is not particularly limited. Since the flat fuel cell assembly of the present invention generates water in the cathode catalyst layer 113 during the reaction, the size of the openings 116 for the gas barrier material layer 108 must be designed in consideration of avoiding to be drowned by water. From experience, in order to prevent the openings 116 from being blocked by water, the minimum aperture of the opening 116 must be larger than twice of the thickness of the gas barrier material layer 108. That is, if the opening 116 is a round opening, the diameter must be larger than twice of the thickness of the gas barrier material layer 108. In this embodiment, the diameter of the opening 116 is about over 200 μm. If the opening 116 is a rectangular opening, the length of the short side must be larger than twice of the thickness of the gas barrier material layer 108, and in this embodiment, the length of the short side of the opening 116 is about over 200 μm.

The overall opening ratio of the gas barrier material layer 108 falls within 0.5%-60%, and in an embodiment of the present invention, the opening ratio of the gas barrier material layer 108 is, for example, about 5%. The adaptability of the opening ratio for the gas barrier material layer of the present invention is illustrated blow through being calculated by the following equations. Generally speaking, when the fuel electrode assembly generates a current of 1 A, the cathode catalyst layer requires 3.5 ml/min of $O_2$ to participate in the reaction, that is, about 17.4 ml/min of air. In practical application, at least 1.1-4 times of that amount of air is required to ensure that sufficient $O_2$ has entered into the cathode catalyst layer. The air permeability of the gas barrier material layer is estimated through the following diffusion equation:

$$i = -nFD\frac{\Delta C}{\Delta y}, \quad (1)$$

wherein, i indicates the current generated in each unit of area, with the unit as $A/cm^2$; n indicates the mole ratio, and in the reaction of the cathode catalyst layer, there is 1 mole of $O_2$ to 4 mole of electrons, and thus n is 4; F indicates the coul for each mole of electrons, with the value of about 96500 coul/mole; D indicates the diffusion coefficient, with the unit of $cm^2/s$, and generally, the diffusion coefficient of $O_2$ in the air is about 0.2-0.3 $cm^2/s$; ΔC indicates the concentration difference, with the unit as $mole/cm^3$, and in the normal temperature environment of 1 atmospheric pressure, there are about $8.6\times10^{-6}$ mole of $O_2$ for 1 cubic centimeter; and Δy indicates the length of the diffusion path, with the unit as centimeter. Taking the thickness of the gas barrier material layer being $1\times10^{-2}$ cm and the opening ratio of the gas barrier material layer being 1% for example, the current value i calculated through Equation (1) is 660 $mA/cm^2$, and the value must be divided by 1.1-4, which is sufficient for supplying the electric power for most of the circumstances.

Figure 2:
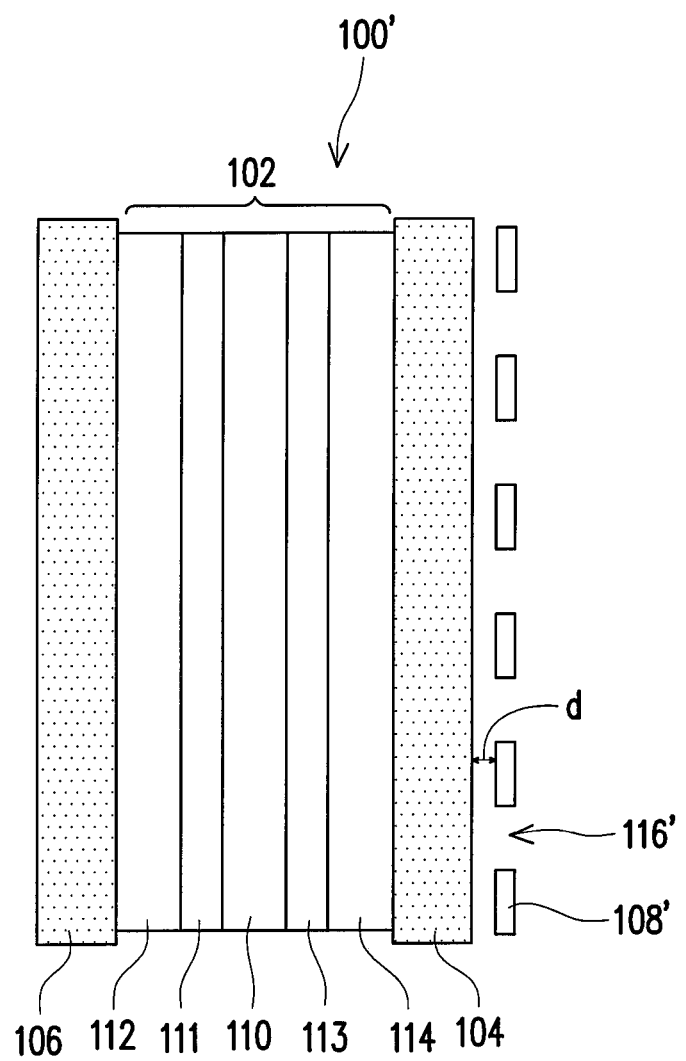
FIG. 2 is a schematic structural view of a flat fuel cell assembly according to another embodiment of the present invention.

Furthermore, referring to FIG. 2, a schematic structural view of a flat fuel cell assembly according to another embodiment of the present invention is shown. As shown in FIG. 2, the flat fuel cell assembly 100' of this embodiment is similar to flat fuel cell assembly 100 of the above embodiment, with the only difference lying in that: the gas barrier material layer 108' of the flat fuel cell assembly 100' is disposed on the cathode porous current collector 104, and it has a plurality of openings 116' for exposing the surface of the cathode porous current collector 104. Moreover, a gap is provided between the gas barrier material layer 108' and the cathode porous current collector 104, and the width d of the gap falls within 0-1.5 cm.

The flat fuel cell assembly of the present invention only needs to dispose a gas barrier material layer with openings on the cathode porous current collector, and the opening ratio of the gas barrier material layer falls within a certain range, such that the cathode catalyst layer is capable of reducing the evaporation of the water, which causes a concentration gradient difference from the cathode catalyst layer to the anode catalyst layer, thereby causing the water of the cathode catalyst layer to diffuse towards the anode catalyst layer, and thus the water of the cathode catalyst layer is recycled at the anode catalyst layer for being reused. Therefore, the manufacturing method is relatively simple, and the elements required for the whole fuel cell is fewer, which thus saving the manufacturing cost. On the other aspect, the present invention may recycle the water in the cathode catalyst layer in a simple and effective way without changing the inner structure of the MEA in the existing fuel cell.

It should be noted that, since the flat fuel cell assembly of the present invention enables the water of the cathode catalyst layer to be recycled to the anode catalyst layer for being reused, a fuel with a high concentration can be used for the reaction, thereby enhancing the energy conversion efficiency of the fuel.

Then, the method for recycling the water in the cathode catalyst layer of the flat fuel cell assembly is illustrated below in great detail by taking the flat fuel cell assembly 100 in FIG. 1 as an example.

Referring to FIG. 1 again, the fuel is fed into the anode porous current collector 106, and in this embodiment, the methanol (MeOH) aqueous solution is taken as the fuel. Certainly, the fuel of the flat fuel cell assembly in the present invention further includes ethanol, propanol or another suitable fuel. Then, the air is entered therein via the opening 116 of the gas barrier material layer 108, and it is transmitted to the cathode catalyst layer 113 after passing through the cathode porous current collector 104 and the cathode GDL 114. Then, under the effect of the anode catalyst layer 111, the methanol aqueous solution is reacted to generate protons (H+), electrons (e−) and carbon dioxide ($CO_2$). The generated protons reach the cathode catalyst layer 113 via the proton conducting membrane 110, and the electrons reach the cathode catalyst layer 113 via the external circuit, which are reacted with O provided by the air to form into water ($H_2O$) under the effect of the cathode catalyst layer 113. After water is generated from the reaction in the cathode catalyst layer 113, the gas barrier material layer 108 controls the evaporation speed of the water accumulated in the cathode catalyst layer 113, which causes a concentration difference of water at the left and right sides of the proton conducting membrane 110, such that the water in the cathode catalyst layer 113 diffuses towards the anode catalyst layer 111, thereby achieving the object of recycling the water.

Figure 3:
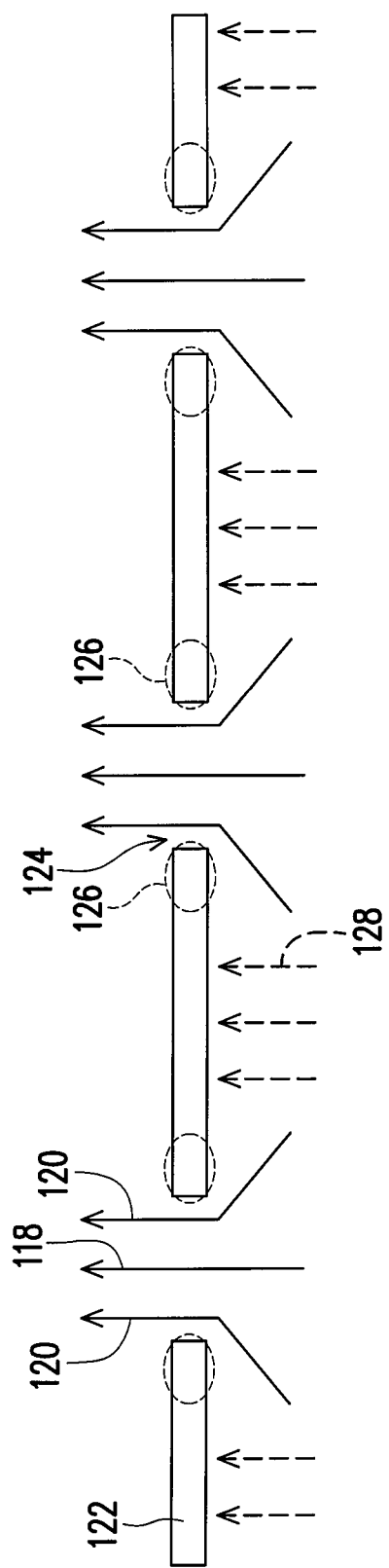
FIG. 3 shows an evaporation mechanism of water generated at the cathode catalyst layer of the flat fuel cell assembly according to the present invention.

Specifically, referring to FIG. 3, an evaporation mechanism of water generated at the cathode catalyst layer of the flat fuel cell assembly according to the present invention is shown. Merely the gas barrier material layer is depicted in FIG. 3, but other means of the flat fuel cell assembly are omitted. As shown in FIG. 3, water vapors generated at different positions have different evaporation paths. A portion of the water vapor generated from the reaction of the cathode catalyst layer passes through an opening 124 of a gas barrier material layer 122 along evaporation paths 118, 120, and then vanished to the atmosphere. Furthermore, as shown by the evaporation path 128, the other water vapors are blocked by the gas barrier material layer 122. As known from the above that, the gas barrier material layer in the flat fuel cell assembly of the present invention not only can reduce the overall evaporation rate of the water vapor, but also enhance the humidity, and thus achieving the object of recycling the water.

Referring to FIG. 3 again, as known from the evaporation paths 118, 120, and 128, the surrounding area 126 of the opening 124 of the gas barrier material layer 122 is a relatively dry area, that is, the surrounding area 126 of the opening 124 has a lower humidity compared with the gas barrier material layer 122 in the other areas. Therefore, in order to achieve a preferred effect of recycling the water, the flat fuel cell assembly of the present invention is further provided with a hydrophobic porous material layer, which is further described below through a plurality of embodiments.

Figure 4:
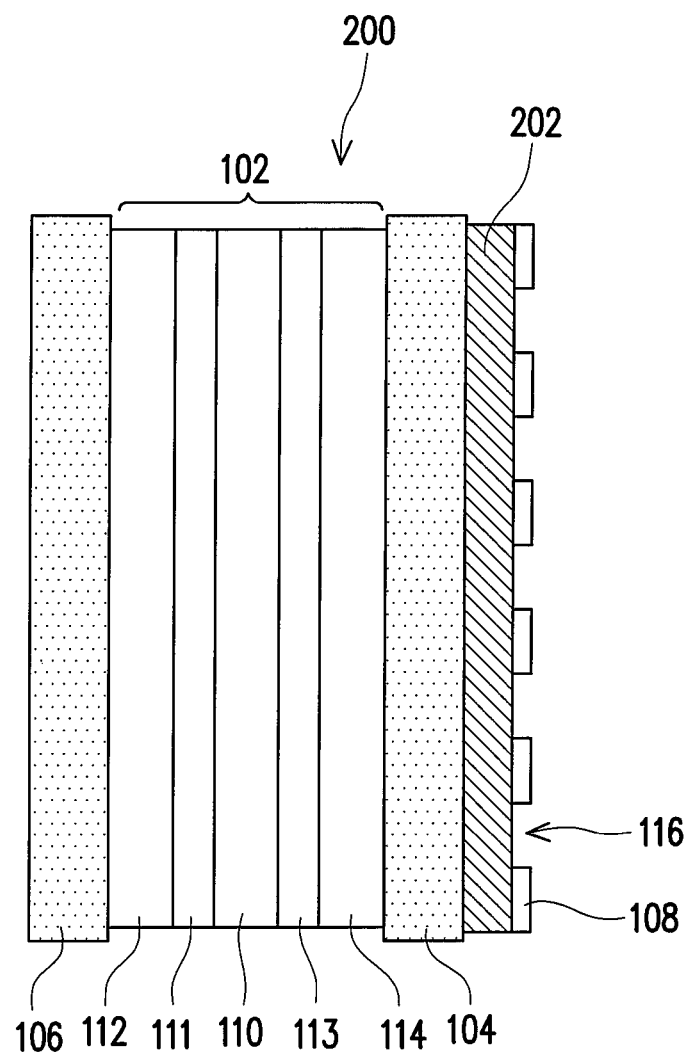
FIG. 4 is a schematic structural view of a flat fuel cell assembly according to still another embodiment of the present invention.

Referring to FIG. 4, it is a schematic structural view of a flat fuel cell assembly according to still another embodiment of the present invention. As shown in FIG. 4, the flat fuel cell assembly 200 of this embodiment is similar to the flat fuel cell assembly 100 of FIG. 1, but the main difference there-between lies in that the flat fuel cell assembly 200 further includes a hydrophobic porous material layer 202. The hydrophobic porous material layer 202 is disposed between the cathode porous current collector 104 and the gas barrier material layer 108, and completely covers the cathode porous current collector 104. The hydrophobic porous material layer 202 is mainly made of, for example, PTFE, PP, PES, or relevant material with hydrophobic measures coated on its surface and the opening. A thickness of the hydrophobic porous material layer 202 is between about 100 μm to 2 mm, for example. The hydrophobic porous material layer 202 has a function of maintaining the water vapors, such that the evaporation speed at the area right below the opening 116 of the gas barrier material layer 108 and the surrounding area is reduced. In other words, no relatively dry areas exist surrounding the opening 116 of the gas barrier material layer 108, and the gas barrier material layer 108 can have an extremely high and uniform humidity, and thus, the effect of recycling the water is preferably enhanced and becomes stable.

Figure 5:
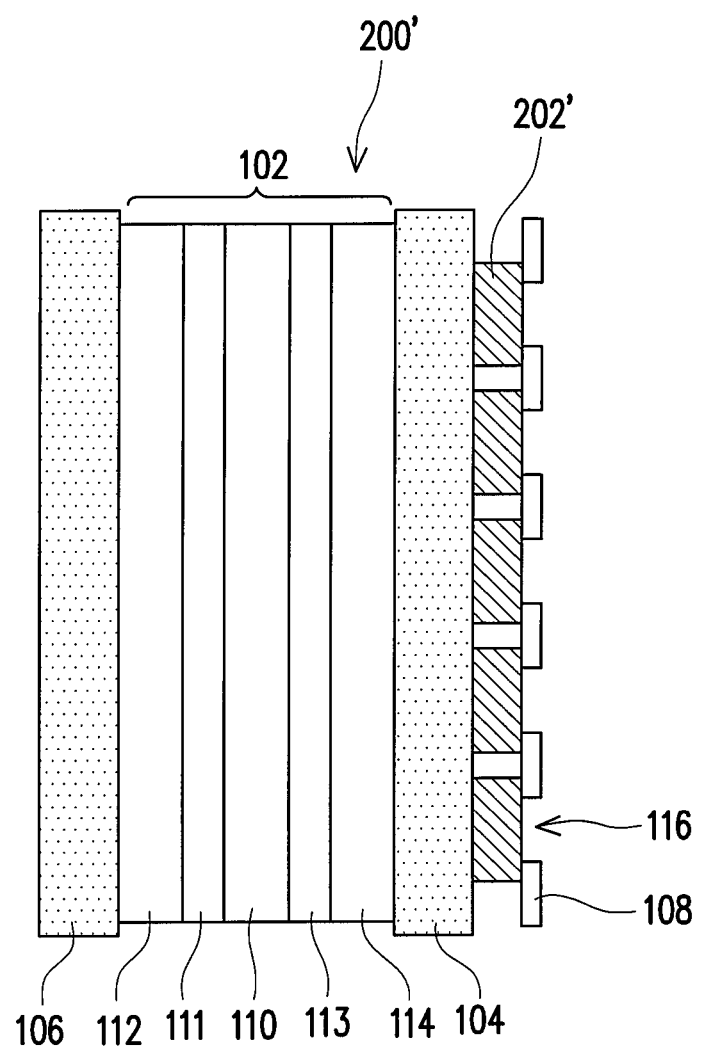
FIG. 5 is a schematic structural view of a flat fuel cell assembly according to yet another embodiment of the present invention.

Referring to FIG. 5, it is a schematic structural view of a flat fuel cell assembly according to yet another embodiment of the present invention. As shown in FIG. 5, the flat fuel cell assembly 200' of this embodiment is similar to the flat fuel cell assembly 100 of FIG. 1, but the main difference there-between lies in that the flat fuel cell assembly 200' further includes a hydrophobic porous material layer 202'. The hydrophobic porous material layer 202' is disposed between the cathode porous current collector 104 and the gas barrier material layer 108, and located on the cathode porous current collector 104 exposed by the opening 116 of the gas barrier material layer 108. The hydrophobic porous material layer 202' is made of, for example, PTFE, PP, PES, or relevant material with hydrophobic measures coated on the surface and opening. a thickness of the hydrophobic porous material layer 202' is between about 100 μm to 2 mm. The hydrophobic porous material layer 202' not only can reduce the evaporation rate at the area right below the opening 116 of the gas barrier material layer 108 and that at the surrounding area to enhance the effect of recycling the water, but also further force the water vapors below the gas barrier material layer 108 to diffuse transversally, which is helpful for the gas barrier material layer 108 to achieve an extremely high and uniform humidity.

Additionally, the practical test data of the present invention are shown in Table 1, including the test results of Comparative Examples 1-2 and Experimental Examples 1-7, wherein the Comparative Examples 1-2 are tests performed when the flat fuel cell assembly is not provided with the gas barrier material layer, and Experimental Examples 1-2, 3-4, 5-6 are tests performed when the flat fuel cell assembly is respectively provided with the gas barrier material layer of 100 μm, 200 μm, and 400 μm. Experimental Example 7 is a test performed for the flat fuel cell assembly provided with a gas barrier material layer with a thickness of 100 μm and a hydrophobic porous material layer with a thickness of 500 μm.

TABLE 1

| | Thickness of Gas Barrier Material Layer (μm) | Opening Ratio of Gas Barrier Material Layer | Concentration of Fuel (vol. %) | Actual Water Consumption of Anode/ Theoretical Water Consumption of Anode |
|---|---|---|---|---|
| Comparative Example 1 | no | 100% | 3 | 2.13 |
| Comparative Example 2 | no | 100% | 10 | 12.41 |
| Experimental Example 1 | 100 | 3% | 10 | −0.25 |
| Experimental Example 2 | 100 | 4% | 8.5 | −0.02 |
| Experimental Example 3 | 200 | 21% | 10 | −2.56 |
| Experimental Example 4 | 200 | 11% | 10 | −2.97 |
| Experimental | 400 | 21% | 10 | −2.74 |

TABLE 1-continued

| | Thickness of Gas Barrier Material Layer (μm) | Opening Ratio of Gas Barrier Material Layer | Concentration of Fuel (vol. %) | Actual Water Consumption of Anode/ Theoretical Water Consumption of Anode |
|---|---|---|---|---|
| Example 5 Experimental Example 6 | 400 | 11% | 10 | −3.14 |
| Experimental Example 7 | 100 μm of gas barrier material layer + 500 μm of hydrophobic porous material layer | 5% | 10 | −6.28 |

As known from the test results of Comparative Examples 1-2, the flat fuel cell assembly without being provided with a gas barrier material layer cannot achieve the object of recycling the water. As known from the test results in Experimental Example 1, when the thickness of the gas barrier material layer is 100 μm, the opening ratio is 3%, and the actual water consumption of anode/theoretical water consumption of anode is −0.25, which indicates that the water recycled from the cathode is larger than that consumed at the anode, that is, the effect of recycling water from the cathode is achieved. Therefore, it is known that the flat fuel cell assembly of the present invention is indeed capable of recycling the water from the cathode catalyst layer for being reused.

Furthermore, as known from Experimental Examples 3 and 4, and Experimental Examples 5 and 6, under the circumstance that the thicknesses of the gas barrier material layer are the same, the smaller the opening ratio is, the more preferred the water recycling effect in the cathode is. In additionally, as known from the test results of Experimental Examples 3 and 5, Experimental Examples 4 and 6, the thicker the gas barrier material layer is, the more preferred the water recycling effect in the cathode is.

Furthermore, as known from the comparison between Experimental Examples 1 and 2 and Experimental Example 7, a hydrophobic porous material layer is further added on the inner side of the gas barrier material layer, which can further achieve a more preferred effect of recycling the water at the cathode.

As known from the test results of Table 1, the thickness of the gas barrier material layer, the opening ratio and the concentration of the fuel all influence the amount of the water that is recycled at the cathode. Generally, the thicker the gas barrier material layer is, the smaller the opening ratio is, the less the water is evaporated, and the higher the water concentration is at the cathode. The higher the fuel concentration is at the anode, it is more useful for generating a concentration gradient for the water to be diffused back to the anode. Therefore, as long as these conditions are matched appropriately, the flat fuel cell assembly of the present invention can achieve the object of recycling the water at the cathode catalyst layer back to the anode catalyst layer for being reused.

To sum up, the present invention at least has the following advantages.

1. The manufacturing method of the present invention is relatively simple and the elements required in the whole fuel cell are fewer, thereby saving the manufacturing cost.

2. The present invention can recycle the water in the cathode catalyst layer simply and effectively without changing the inner structure of the existing MEA.

3. The present invention uses a high-concentration fuel for the reaction, thereby enhancing the energy conversion efficiency of the fuel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flat fuel cell assembly, comprising:
a membrane electrode assembly (MEA), comprising a proton conducting membrane, an anode catalyst layer, a cathode catalyst layer, an anode gas diffusion layer (GDL) and a cathode GDL, wherein the anode catalyst layer and the cathode catalyst layer are respectively disposed on two sides of the proton conducting membrane, and the anode GDL and the cathode GDL are respectively disposed on the anode catalyst layer and the cathode catalyst layer;
a cathode porous current collector, disposed on one side of the cathode GDL of the MEA;
an anode porous current collector, disposed on one side of the anode GDL of the MEA; and
a gas barrier material layer, disposed above the cathode porous current collector, and having at least one opening for exposing the surface of the cathode porous current collector, wherein the opening ratio of the gas barrier material layer falls within 0.5%-21%, the thickness of the gas barrier material layer falls within 10 μm-5 mm, and a minimum aperture of the opening is larger than twice of the thickness of the gas barrier material layer.

2. The flat fuel cell assembly as claimed in claim 1, wherein the material of the gas barrier material layer comprises a polyester polymer or a polyolefin polymer.

3. The flat fuel cell assembly as claimed in claim 2, wherein the polyester polymer comprises polyethylene terephthalate (PET) or polyacrylonitrile (PAN).

4. The flat fuel cell assembly as claimed in claim 1, wherein a gap is provided between the gas barrier material layer and the cathode porous current collector.

5. The flat fuel cell assembly as claimed in claim 4, wherein the width of the gap falls within 0 cm-1.5 cm.

6. The flat fuel cell assembly as claimed in claim 1, further comprising a hydrophobic porous material layer disposed between the cathode porous current collector and the gas barrier material layer.

7. The flat fuel cell assembly as claimed in claim 6, wherein the hydrophobic porous material layer completely covers the cathode porous current collector.

8. The flat fuel cell assembly as claimed in claim 6, wherein the hydrophobic porous material layer is made of polytetrafluoroethylene (PTFE), polypropylenen (PP), or polyethersulfone (PES).

9. The flat fuel cell assembly as claimed in claim 1, wherein the material of the proton conducting membrane comprises polymeric membrane.

10. The flat fuel cell assembly as claimed in claim 1, wherein the material of the anode catalyst layer comprises Pt/Ru alloy, carbon material particles plated with Pt/Ru alloy, or carbon material particles plated with Pt.

11. The flat fuel cell assembly as claimed in claim 1, wherein the material of the cathode catalyst layer comprises Pt alloy, carbon material particles plated with Pt alloy, or carbon material particles plated with Pt.

* * * * *